US006320608B1

(12) United States Patent
Yap et al.

(10) Patent No.: US 6,320,608 B1
(45) Date of Patent: Nov. 20, 2001

(54) REMOTE INSTALLATION AND REMOVAL TOOL FOR VIDEO SURVEILLANCE CAMERA ASSEMBLY

(75) Inventors: Walter N. Yap, Boca Raton; Sergio M. Perez, Boynton Beach; Luis E. Anderson; David A. Haney, both of Boca Raton, all of FL (US)

(73) Assignee: Sensormatic Electronics Corp., Boca Raton, FL (US)

( * ) Notice: Subject to any disclaimer, the term of this patent is extended or adjusted under 35 U.S.C. 154(b) by 0 days.

(21) Appl. No.: 09/041,549

(22) Filed: Mar. 12, 1998

(51) Int. Cl.$^{7}$ .......................... H04N 7/18; H04N 5/225; B25B 13/56

(52) U.S. Cl. .......................... 348/73; 348/143; 81/176.1

(58) Field of Search .......................... 348/373, 143, 348/144–150; 396/427; 294/19.1; 81/176.1, 176.15, 176.2, 461, 124.2

(56) References Cited

U.S. PATENT DOCUMENTS

| | | | | |
|---|---|---|---|---|
| 5,048,378 | * | 9/1991 | Nikolas | 81/461 |
| 5,553,373 | * | 9/1996 | Sprayberry | 294/19.1 |
| 5,647,253 | * | 4/1995 | Pozek | 81/176.1 |
| 5,649,255 | | 7/1997 | Schieltz | 396/427 |
| 5,809,850 | * | 12/1996 | Tickner | 81/53.11 |
| 5,875,694 | * | 4/1997 | Graf | 81/176.1 |

* cited by examiner

*Primary Examiner*—Wendy R. Garber
*Assistant Examiner*—Rashawn N. Tilley
(74) *Attorney, Agent, or Firm*—Robin, Blecker & Daley

(57) ABSTRACT

A surveillance camera assembly housing is releasably locked to a base for the housing. The base is installed on a ceiling or at another location remote from ground level. A removal tool head, in the form of a hollow cylinder, is provided at the end of a pole. Slots formed in the tool head engage ridges on the camera assembly housing. The assembly housing is twisted to release it from the base and then is brought to ground level while contained within the tool head.

25 Claims, 7 Drawing Sheets

REMOTE INSTALLATION AND REMOVAL TOOL FOR VIDEO SURVEILLANCE CAMERA ASSEMBLY

FIELD OF THE INVENTION

This invention is concerned with video surveillance camera mounting assemblies, and with methods of, and tools for, installing video surveillance cameras and removing installed cameras.

BACKGROUND OF THE INVENTION

It is well known to provide mounting structures for video cameras to be installed in or near buildings to be protected by a video surveillance system. The mounting structures typically include a housing that is secured to the ceiling of the building or at another suitable location on the building. The housing contains a video camera, motors and other components which permit the camera to be moved by remote control through a range of motion, and electronics for receiving control signals and transmitting video signals generated by the camera. Frequently, a portion of the enclosure is in the shape of a dome and is formed of plastic which permits incident light to enter and be captured by the video camera. The assembly, including the housing, the camera, and associated components, is commonly referred to as a "dome", taking its name from the dome-shaped portion of the housing.

After the initial installation of the dome, the need arises from time to time to remove the dome for purposes such as routine maintenance, repair or replacement. For that reason, known camera dome mounting systems have included a plurality of spring-loaded rods which are releasably inserted into suitably shaped brackets secured to the ceiling or other support structure. However, removable of this known type of camera dome from the structure on which it is installed requires the individual assigned to perform the removal to disengage the spring-loaded rods by hand from the mounting bracket, usually while standing on a ladder or on scaffolding or the like. Similarly, installation of the camera dome also requires manipulation of the spring-loaded rods, while standing on the ladder or scaffolding. Neither removal nor installation of the prior art camera dome can be considered easy or convenient, and either operation may entail some risk for individuals who do not adapt easily to performing tasks while standing on a ladder or scaffold.

To overcome the disadvantages of prior dome mounting systems, a system utilizing a pole-mounted installation and removal tool has been proposed in U.S. Pat. No. 5,649,255, which was issued to Steven W. Schieltz and is commonly assigned with the present application. (The disclosure of the '255 patent is incorporated herein by reference.) The inventors of the present application have now provided improvements upon Schieltz's system in terms of simplifying the removal and installation tool, reducing the cost of manufacture thereof, and also simplifying the procedures required for installation and removal of camera domes.

OBJECTS AND SUMMARY OF THE INVENTION

It is accordingly an object of the invention to facilitate removal and replacement of video surveillance domes.

It is a further object of the invention to provide an improved tool for remote installation and removal of video surveillance domes.

According to an aspect of the invention, there is provided a tool for removing a surveillance camera assembly housing from a base on which the assembly is mounted, including a pole portion, and a camera assembly housing engagement portion mounted on the pole portion, and the engagement portion including structure for engaging the camera assembly housing at a plurality of points on the peripheral surface of the assembly housing, the engagement portion being formed as a single unitary body. Further in accordance with this aspect of the invention, the engagement portion may be generally in the shape of a hollow cylinder in which the camera assembly housing is contained when the housing is engaged by the engagement portion. The engagement portion may include a plurality of slots formed in the cylinder, each for engaging a respective rib which projects outwardly from the peripheral surface of the camera assembly housing. Preferably, the engagement portion is mounted on the pole portion in a manner which prevents rotation and pivoting of the engagement portion relative to the pole portion.

According to another aspect of the invention, there is provided a method of installing a surveillance camera assembly housing on a mounting base, including the steps of providing an installation tool which includes a generally cylindrical hollow member, engaging the housing with the installation tool by placing the housing inside the hollow member, lockingly mounting the housing on the mounting base by manipulating the installation tool with the housing inside the hollow member, and then disengaging the installation tool from the housing.

According to still another aspect of invention, there is provided a method of removing a surveillance camera assembly housing from a base on which the assembly housing is lockingly mounted, the method including the steps of providing an installation tool which includes a generally cylindrical hollow member, engaging the housing with the installation tool by moving the hollow member relative to the housing so that the housing is inserted into the hollow member, and releasing a locking mechanism which secures the housing to the base by manipulating the installation tool with the housing inside the hollow member.

According a further aspect of the invention, there is provided a surveillance camera mounting system, including a base for being mounted on a support structure, a surveillance camera assembly housing for being removably mounted to the base, a tool for removing the housing from the base, the tool including a generally cylindrical hollow member sized to have the assembly housing placed within the hollow member, and structure provided on the hollow member for engaging the assembly housing.

According to still a further aspect of the invention, there is provided a surveillance camera mounting system, including a base for being mounted on a support structure, and a surveillance camera assembly housing for being removably mounted on the base, with the base including a shelf member on which the assembly housing is supported, and the assembly housing having an aperture in a top surface of the housing, the shelf member being inserted in the aperture, and the housing also having a cam surface adjacent to the aperture, the cam surface being inclined relative to a horizontal plane for contacting the shelf member and camming the housing in an upward direction when the housing is rotated relative to the base.

According to yet another aspect of the invention, there is provided a surveillance camera mounting system, including a base for being mounted on a support structure, and a surveillance camera assembly housing for being removably mounted on the base, the assembly housing having a substantially cylindrical peripheral surface and three vertically-oriented ribs arranged at intervals around the peripheral surface.

DESCRIPTION OF PREFERRED EMBODIMENTS

An embodiment of the invention will now be described, initially with reference to FIG. 1.

Figure 1:
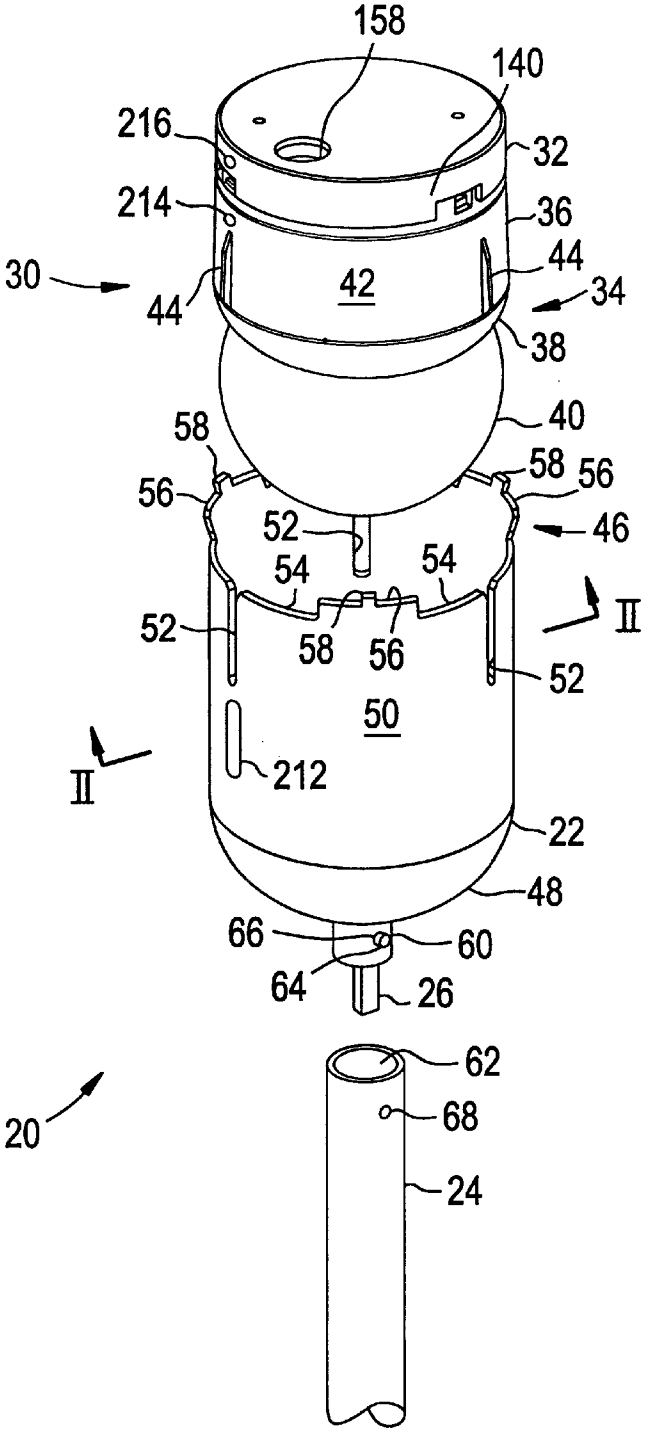
FIG. 1 is a perspective view showing an installation and removal tool provided in accordance with the invention in a partially-disassembled condition, together with a surveillance camera assembly provided in accordance with the invention.

Reference numeral 20 in FIG. 1 generally indicates a dome installation and removal tool provided in accordance with the invention. The tool 20 is made up of a head portion 22 and a pole portion 24 to which the head portion 22 is selectively mountable by means of mounting portion 26.

Also shown in FIG. 1 is a video surveillance camera dome assembly 30. The dome assembly 30 is made up of a base 32 which is adapted to be permanently mounted on a ceiling or other support structure, and an assembly housing 34 which is adapted to be removably mounted to the base 32. The housing 34, in turn, includes a generally cylindrical main body 36, a skirt 38, and a generally spherical dome portion 40. The body portion 36 of the assembly housing 34 has an external or peripheral surface 42 on which vertically extending ribs 44 are formed. Preferably, the number of ribs is three in all, and the ribs are arranged at intervals of 120° around the peripheral surface 42.

Continuing to refer to FIG. 1, the head portion 22 of the installation/removal tool 20 is generally in the form of a hollow cylinder, with a flared opening 56 at the top of the head portion 22 and a bowl-shaped portion 48 closing the bottom of the head portion 22.

The head portion 22 of the tool 20 is of a size and shape to permit substantially all of the assembly housing 34 to be accommodated within the head portion 20. Although generally cylindrical, the continuous wall 50 which makes up most of the head portion 22 is preferably formed so as to flare outwardly, to a small extent, as one proceeds upwardly from the bowl portion 48. For example, the amount of outward flaring of the wall 50 may be on the order of a 1° departure from the vertical. Three slots 52 extend vertically downwardly from recessed top edges 54 of the wall 50. The vertical slots 52 are arranged at 120° intervals around the wall 50 and are provided to engage with the three ribs 44 of the housing assembly 34 when the housing assembly 34 is contained within the head portion 22 of the installation/removal tool 20.

Figure 2:
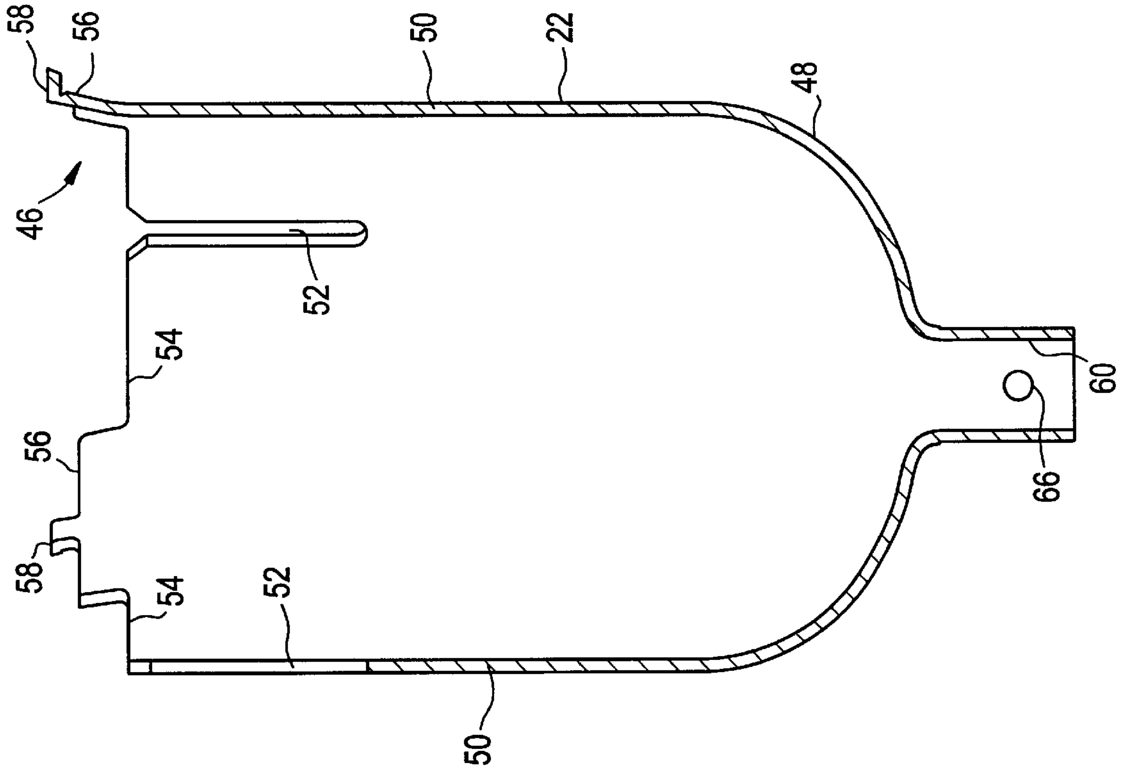
FIG. 2 is a cross-sectional view of the main portion of the installation and removal tool, taken at the line II—II in FIG. 1.

Outwardly flaring tabs 56 are formed at the top of the wall 50 and intermediate the recessed top edges 54. Extending upwardly from a central portion of each of the tabs 56 is a hooked finger 58. As will be seen, the fingers 58 (most clearly represented in FIG. 2) may be used to open a sheltering enclosure in which the dome assembly 30 may optionally be installed. The tabs 56 may also be useful in closing such a sheltering enclosure.

Continuing to refer to FIG. 1, the mounting portion 26 of the installation/removal tool 20 is fitted within a throat portion 60 which opens downwardly from the base of the bowl portion 48 of the head portion 22. The throat portion 60 has an outside diameter which is sized to fit rather snugly within an open distal end 62 of the pole portion 24. The mounting portion 26 also may include one or more spring-loaded buttons 64, each of which extends outwardly through a hole 66 in the throat 60. The button 64 is to be retracted when the throat 60 is inserted into the open end 62 of the pole portion 24 and is then aligned with a hole 68 formed near the end 62 of the pole portion 24 so that the button 64 extends into or through the hole 68 to immovably lock the head portion 22 to the pole portion 24.

The head portion 22 may be formed as a single, unitary molded plastic piece comprising the wall 50, the bowl-shaped portion 48 and the throat 60. As an alternative, the wall 50,may be formed as a separate piece joined to a second piece which forms the bowl-shaped portion 48 and the throat 60.

Although not shown in the drawings, it is to be understood that a video camera, associated motors for operating the camera, and suitable electronic components are all disposed within the assembly housing portion 34.

Figure 3:
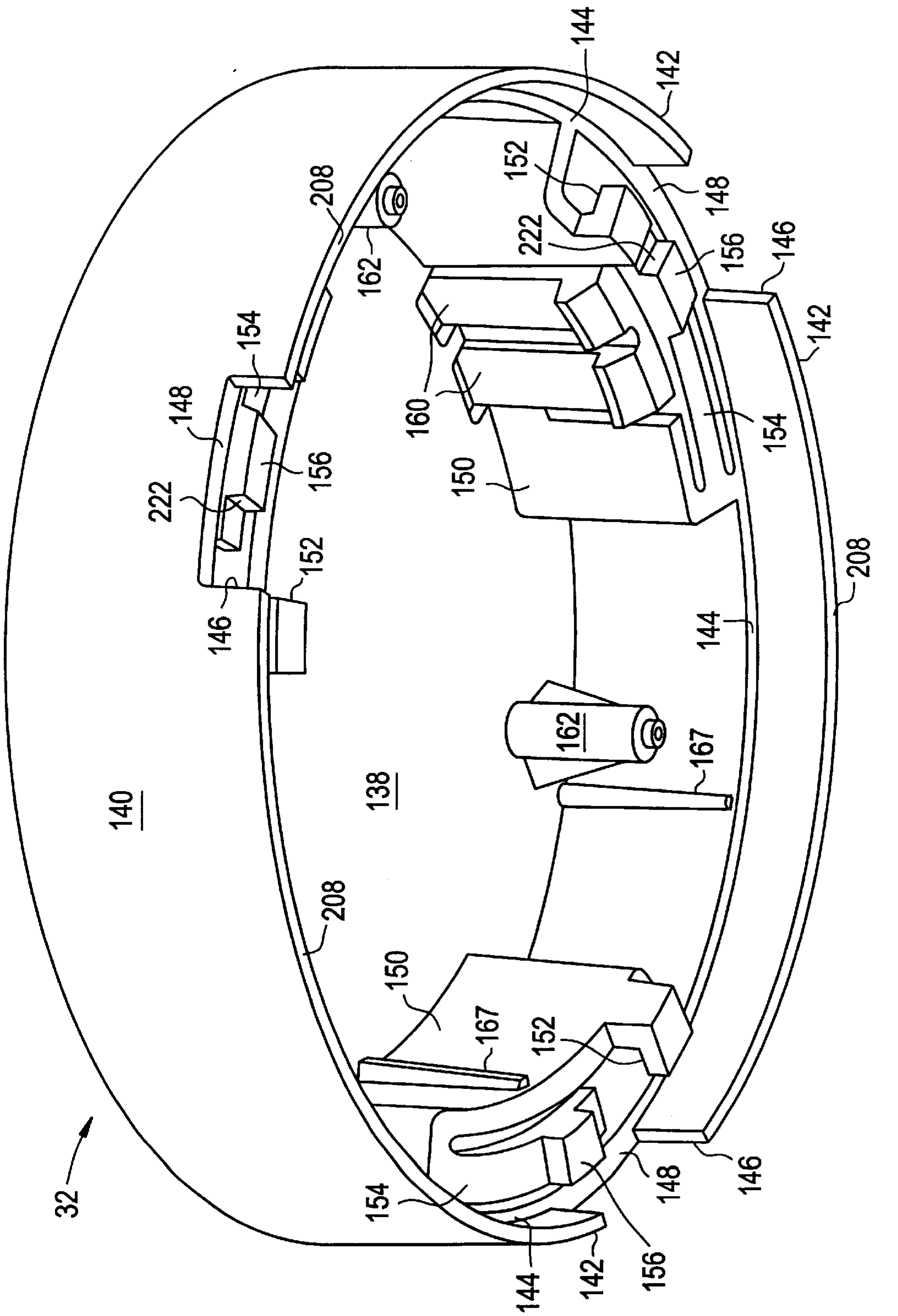
FIG. 3 is a perspective view of interior features of a base portion of the surveillance camera assembly of FIG. 1.
Figure 4:
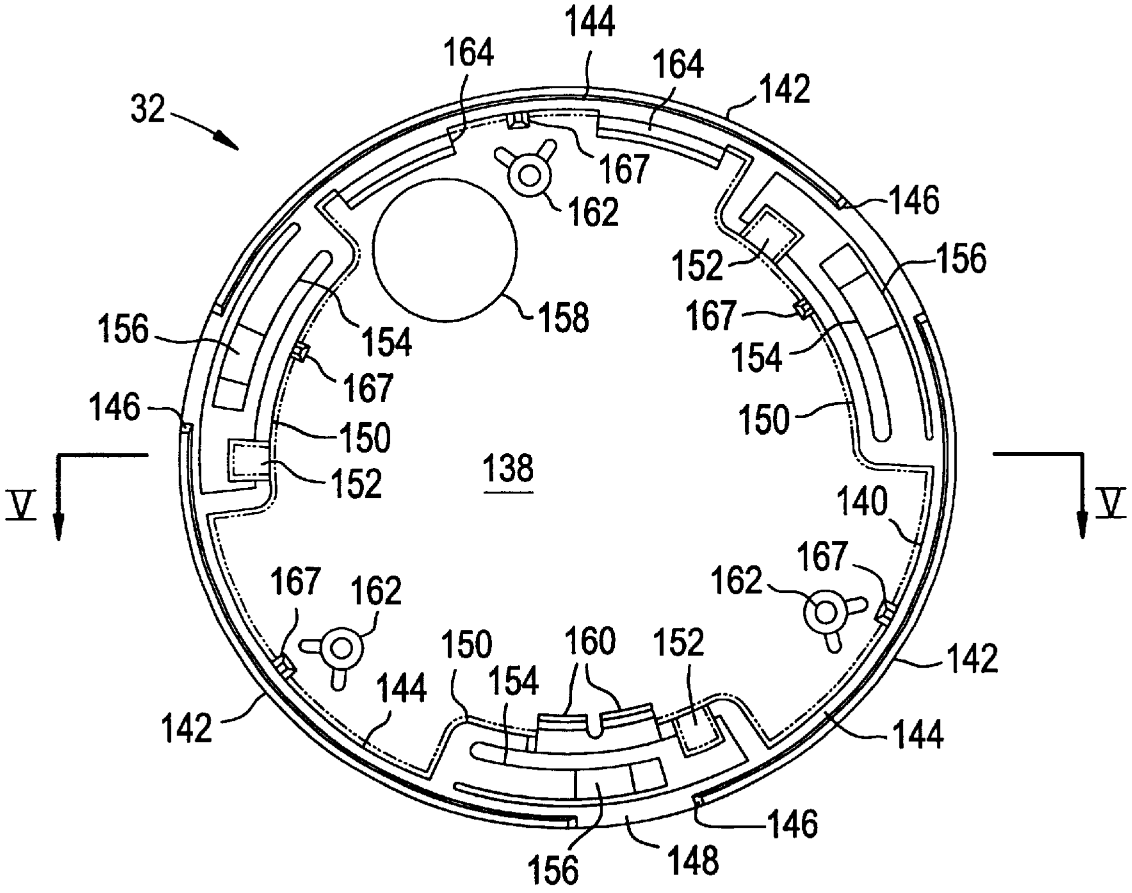
FIG. 4 is an inverted plan view of the base portion of FIG. 3.
Figure 5:
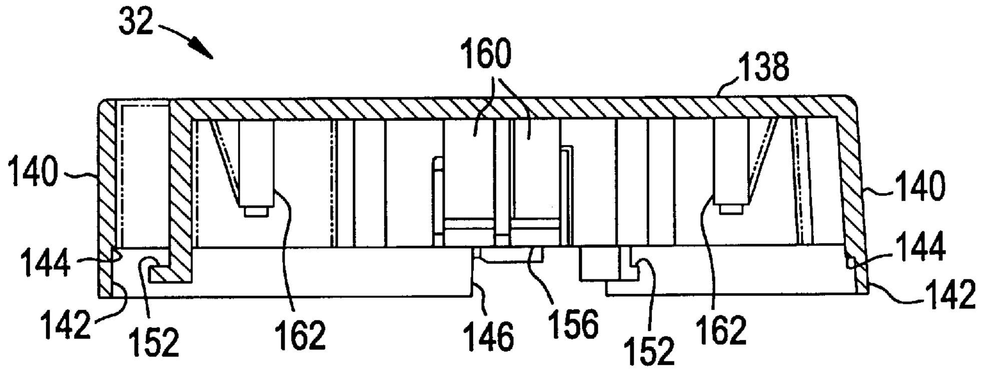
FIG. 5 is a cross-sectional view of the base portion, taken at the line V—V in FIG. 4.

The structure of the base 32 of the dome assembly 30 will now be, described in some detail, with reference to FIGS. 3–5.

The base 32 is preferably formed as a single piece of molded plastic. The base 32 includes a generally flat and circular top plate 138 and a cylindrical wall 140 which extends downwardly from the circular periphery of the top plate 138. The wall 140 is extended further downwardly, over most of the circumference thereof, by three arcuate flange portions 142. The flange portions 142 have a thickness that is less than the thickness of the wall 140 (as seen, for example, from FIG. 5) and the outer surfaces of the flange portions 142 are flush with the outer surface of the wall 140, so that an inverted set-back 144 is formed as a horizontal surface extending inwardly from the junction of the flanges 142 and the wall 140.

It will be observed that the flanges 142 are three in number and define therebetween three slots 146 which extend below the bottom surface 148 of the wall 140. The three slots 146 are arranged at substantially equal angular intervals of about 120° around the periphery of the base 32. In a preferred embodiment of the invention the spacing of the slots 146 (and corresponding portions of the base 32 and housing body 36 which are discussed below) is varied from 120° by a small extent so as to define a single correct rotational orientation in which the body 36 can be installed on the base 32. For example, two of the intervals may be 118° with the other interval then being 124°. The bottom surface 148 of the wall 140 is flush and continuous with the set-back 144 formed by the flanges 42.

In proximity to each of the three slots 146, a corresponding projecting part 150 projects downwardly from the top plate 138 of the base 32. Integrally formed with each projecting part 150 is a respective horizontal, outwardly extending shelf 152. Each shelf 152 is located a short distance inwardly from the corresponding slot 146 and, as seen in FIG. 4, a side of each shelf 152 is substantially aligned with an edge of a corresponding one of the arcuate flanges 142 so that each shelf 152 is offset from its corresponding slot 146 in a direction viewed as counterclockwise in FIG. 4.

Each of the projecting parts 150 also has formed integrally therewith a respective spring clip 154, which extends generally horizontally and in a clockwise direction (as viewed in FIG. 3). Each of the spring clips is formed in an arcuate shape, as best seen from FIG. 4, and is arranged a short distance inwardly and parallel to the circumference of the base portion 32. A locking member 156 is provided on the downward side of the free end of each spring clip 154. Each spring clip 154 is positioned so that its locking member 156 is located substantially opposite, and inwardly from, a respective one of the slots 146.

As will be seen, the shelves 152 and spring clips 154 are provided for securely but releasably mounting the housing body 36 to the base 32. It is contemplated to eliminate the slots 146 and otherwise to substantially modify base 32 without departing from the invention, but shelves 152 and spring clips 154 should be understood as being key portions of base 32, since, as will be seen, shelves 152 and clips 154 interact with the body 36 of the housing 34 for the purpose of lockingly securing the body 36 to the base 32.

Other features of the base include a rather large circular access hole 158 (FIG. 4) formed in the top plate 138 of the base portion. The access hole 158 is provided as a point of entry for power, control and video signal cabling (not shown). Also included as features of the base 32 are a pair of adjacent PCB support fingers 160, three PCB positioning bosses 162, and a pair of PCB support members 164 (FIG. 4). The elements 160, 162 and 164 are all provided to permit a printed circuit board 166 (not shown in FIGS. 3–5, see FIG. 6) to be mounted in the base 32. Reinforcing ribs 167 are also provided at appropriate locations on internal surfaces of the base 32.

Figure 6:
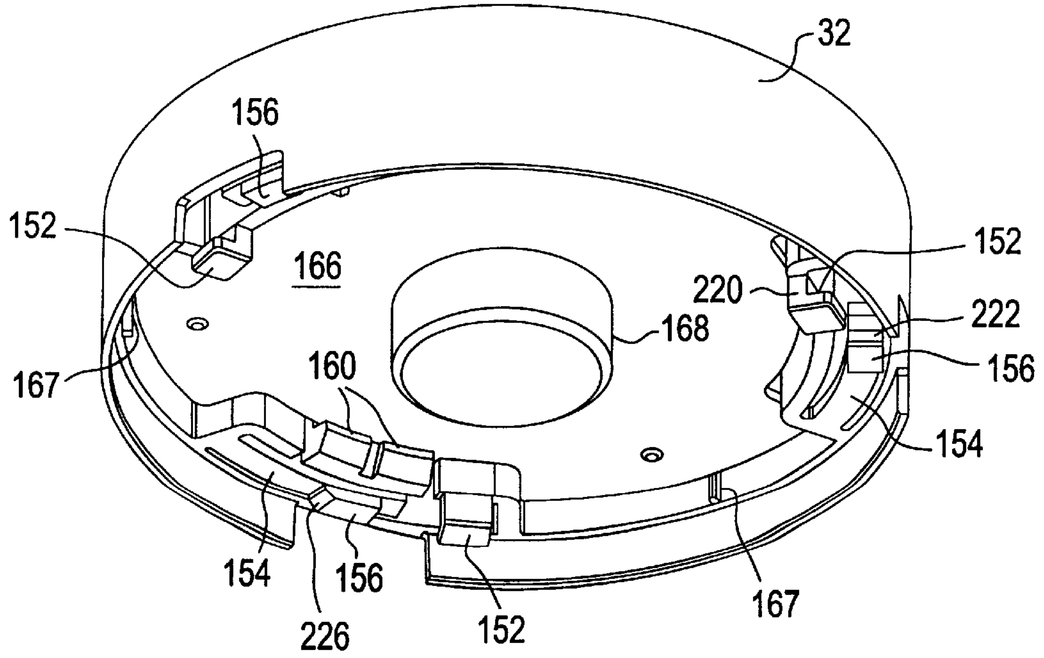
FIG. 6 is a view of the base portion of the camera assembly, similar to FIG. 3, but with a printed circuit board installed in the base portion.

As seen from FIG. 6, in which the printed circuit board 166 is shown installed within the base 32, the PCB 166 includes a cylindrical part 168 which extends downwardly from the board 166. Contained within and protected by the part 168, but not shown in the drawing, are contacts for providing electrical connections between circuitry disposed on the PCB 166 and electronic components contained within the housing body 36 of the assembly housing 34.

Figure 7:
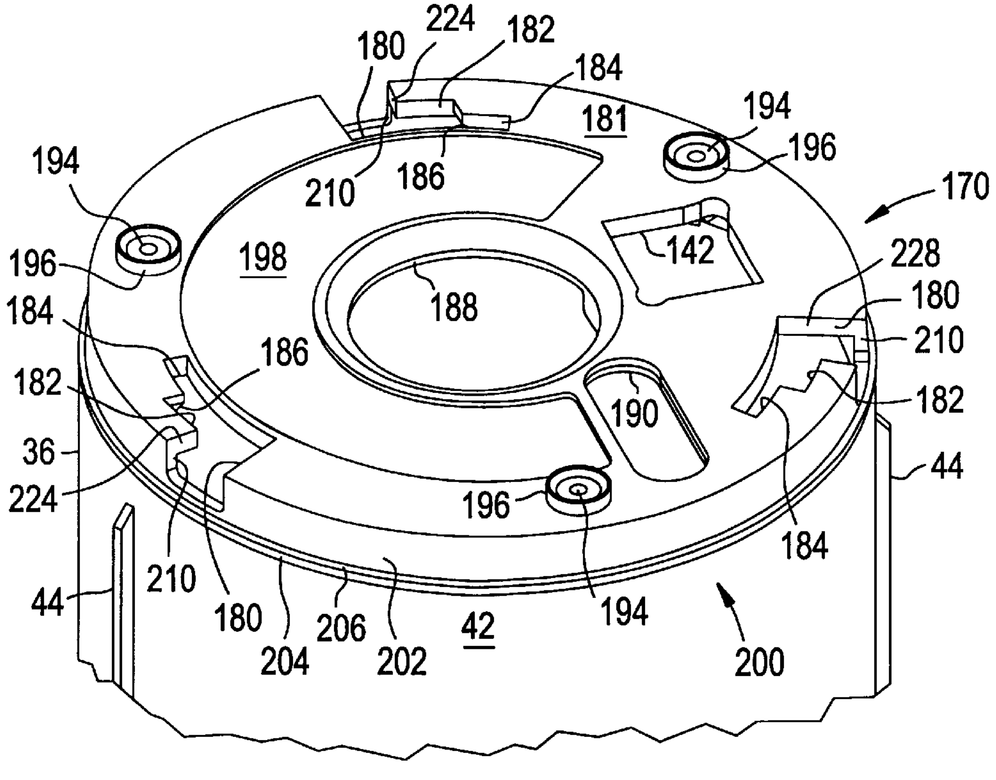
FIG. 7 is a perspective view showing the top of the main housing of the camera assembly.
Figure 8A:
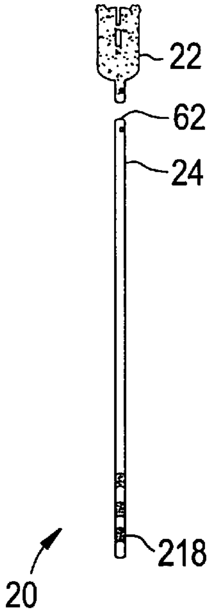
FIG. 8 schematically illustrates operations carried out by using the installation and removal tool of FIG. 1.
Figure 8B:
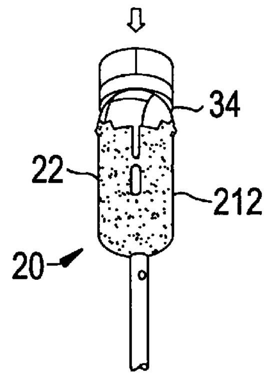
Figure 8C:
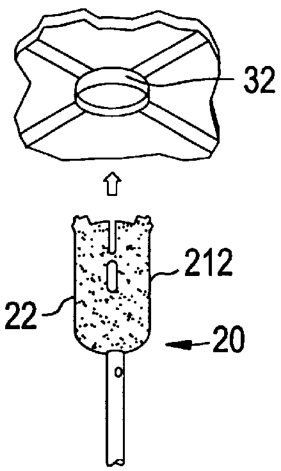
Figure 8D:
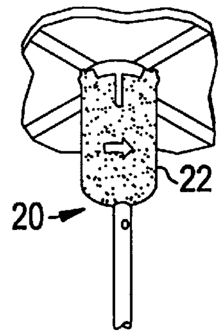
Figure 8E:
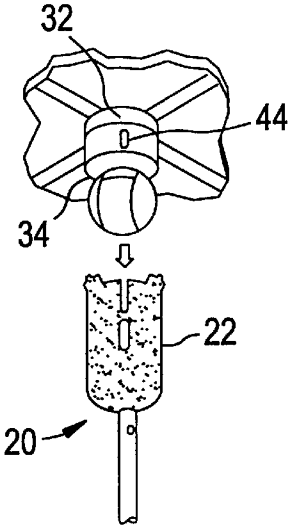
Figure 8F:
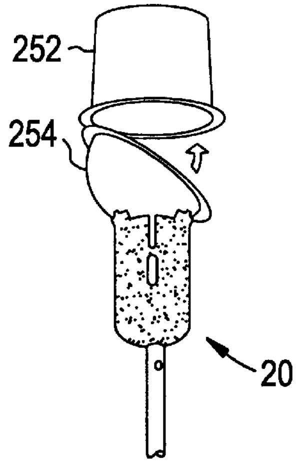
Figure 8G:
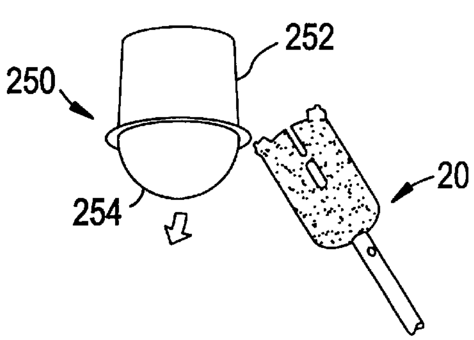

FIG. 7 is a perspective view showing the top part 170 of the housing body 36. The top part 170 includes structure (which will now be described) for engaging with the locking structure (shelves 152 and spring clips 154) of the base 32. The top part 170 of the body 36 is generally in the shape of a flat, horizontally-orientated disc which is positioned to close the cylindrical space within the housing body 36. Preferably, the top part 170 is a single molded plastic piece formed separately from, but affixed with screws (not shown) to the cylindrical body 36 of the housing 34.

Of particular importance in terms of the structure of the top part 170 are three stepped slots 180 formed in the upper surface 181 of the top part 170. Serving to partially define each slot 180 is a first cut portion 182, extending inwardly a certain distance from the perimeter of the upper surface 181, and a second cut portion 184 which extends inwardly from the perimeter of the upper surface 181 by a greater distance than the cut portion 182. Adjacent each of the cut portions 184 is a cam surface 186 formed at the lower side of the upper surface 181 and adjacent an edge of the respective cut portion 184. The cam surface 186 is inclined downwardly from the horizontal and in a direction parallel to the adjacent circular outer edge of the upper surface 181. The slots 180 are arranged at angular intervals along the circular outer edge of the upper surface 181, with the intervals separating the slots 180 corresponding to the intervals which separate the locking mechanisms (shelves 152, spring clips 154) provided on the base 32. As will be discussed below, each slot 180 is provided to permit a corresponding one of the shelves 152 to be inserted therein. After insertion of the shelf 152 into the slot 180, the housing body 36 is rotated in a counterclockwise direction (as seen in FIG. 7) so that the second cut portion 184 of the slot 180 is allowed to rest on the corresponding shelf 152 of the base 32.

Other notable features of the top part 170 of the housing body 36 include a large circular hole 188 which is substantially concentric with the top part 170 and is provided to receive the cylindrical part 168 of the PCB 166 (FIG. 6). Additional holes formed through the top part 170 include a race-track shaped hole 190 and a square hole 192 which has two extended, rounded corners. The hole 190 is provided to permit maintenance personnel to access address-setting switches housed within the housing body 36. Hole 192 is for providing access to permit replacement of a programmable logic device chip mounted within the housing body 36. Three screw holes 194 are provided at substantially equal intervals near the outer edge of the top part 170 of housing body 36. These holes 194 are provided for screws (not shown) which attach the top part 170 to the housing body 36. A cylindrical raised boss 196 is provided in a position surrounding each of the screw holes 194. The bosses 196 are provided to maintain adequate spacing between top part 170 and printed circuit board 166 to keep the switches (not shown) in the access hole 190 clear of the printed circuit board 166. Also provided at the upper surface 181 of the top part 170 is an arcuate recess 198 in which a label or decal may be installed.

The top part 170 also includes a cylindrical side wall 200 which includes an upper set-back portion 202 and a lower, larger-diameter portion 204. A ledge 206 is formed at the junction of the wall portions 202, 204. The upper-set-back portion 202 of the side wall 200 has an outer diameter which substantially corresponds to an inner diameter defined by the flanges 142 of base 32 (FIG. 3). When the assembly housing 34 is mounted on the base 32, the flanges 142 of the base 32 are positioned to surround the upper set-back wall portion 202, with the lower edges 208 of the flanges 142 (FIG. 3) confronting the ledge 206 of top part 170.

Although radially-outwardly facing apertures 210 are shown as being formed in the upper wall portion 202 in FIG. 7, it is contemplated in accordance with the invention to eliminate the apertures 210 so that the wall portion 202 is continuous around the entire circumference of top part 170.

Use of the installation/removal tool 20 will now be described, primarily with reference to FIG. 8. FIG. 8(*a*) shows the tool 20 in a disassembled condition with the head portion 22 separate from the pole portion 24. It is to be understood that the pole portion 24 may be of any convenient length, including a length in excess of 10 feet, and also may be arranged to telescope for easy storage. When the dome assembly housing 34 is to be mounted to a base 32 that has previously been mounted on a ceiling, the tool head 22 may be mounted to the pole portion 24 (as indicated at FIG.

8(*a*)) either before or after the dome assembly housing 34 is inserted into the tool head 22 for engagement by the tool head 22.

To aid in mounting the assembly housing 34 in proper alignment with the base 32, alignment marks (best seen in FIG. 1) are provided on the housing 34, the base 32, and the tool head 22.

Specifically, an alignment mark recess and/or logo 212 is provided below and aligned with one and only one of the vertical slots 52 of the tool head 22. In addition, an alignment mark or logo 214 is provided above and in alignment with one and only one of the vertical ribs 44 on the cylindrical body 36 of the assembly housing 34.

A third alignment mark 216 is provided at an appropriate place on the outer surface of the cylindrical wall 140 of the base 32. When the assembly housing 34 is inserted into the tool head 22, as shown in FIG. 8(*b*), this is done with the alignment mark 212 on the tool head 22 aligned with the alignment mark 214 on the assembly housing 34 so that the slot 52 on tool head 22 corresponding to the alignment mark 212 engages the rib 44 associated with the alignment mark 214 on the assembly housing 34. At the same time, each of the other slots 52 of the tool head 22 engages a respective one of the other ribs 44 of the assembly housing 34. The tool 20 is then used to bring the assembly housing 34 into proximity with the base 32 (FIG. 8(*c*)), and the alignment mark 212 of the tool head 22 is aligned with the alignment mark 216 on the base 32. The tool is then used to move the assembly housing 34 upwardly relative to the base 32, causing each of the shelves 152 (FIG. 6) of the base 32 to be inserted into a respective one of the stepped slots 180 (FIG. 7) provided at the top of the assembly housing 34. At this time, the locking members 156 of the spring clips 154 of the base 32 come into abutment with the upper surface 181 of the assembly housing 34.

The proximal end 218 (FIG. 8(*a*)) of the pole portion 24 of the tool is then twisted, causing the tool head 22 to turn as indicated by the arrow in FIG. 8(*d*), thereby causing the assembly housing 34 to be turned in a clockwise direction (as seen from below) relative to the base 32. The rotational motion of the assembly housing 34 relative to the base 32 brings the cam surfaces 186 of the slots 180 (FIG. 7) into contact with respective side faces 220 (FIG. 6) of the shelves 152 of the base 32. Continued rotational movement of the housing 34 relative to the base 32 results in camming action of the cam surfaces 186 to move the housing 34 upwardly relative to the base 32, and against the force of the spring clips 154. Ultimately, the assembly housing 34 reaches a position at which the second cut portions 184 of the top part 170 are supported on the shelves 152 of the base 32. Meanwhile, the slots 180 of the top part 170 reach a position that is directly below the locking members 156 of the spring clips 154, thereby permitting the spring clips 154 to drop down to position the locking members 156 within the slots 180. Further rotation of the housing 34 is prevented when forward faces 222 of the locking members 156 come into contact with trailing sides 224 of the slots 180. At this point the assembly housing 34 is securely mounted to the base 32, and the tool 20 can be removed in a downward direction (FIG. 8(*e*)), thereby releasing the ridges 44 from the slots 52, and completing the installation of the camera dome assembly.

It will be understood that removal of the assembly housing 34 from the base 32 can proceed by performing in reverse order the steps illustrated in FIGS. 8(*b*) through (*e*). Thus, in a first step of a removal procedure, the tool 20 is manipulated so that the tool head 22 is moved upwardly to surround the assembly housing 34 with each of the slots 52 of the tool head 22 engaging a respective one of the ribs 44 on the assembly housing 34. During removal there is no need to make use of the alignment marks on the tool head 22 and the base 32.

The tool is then twisted in the direction opposite to the arrow shown in FIG. 8(*d*), to free the second cut portions 184 of the assembly housing 34 from the shelves 152 of the base 32. Meanwhile, rounded camming surfaces 226 (FIG. 6) of the locking members 156 of the spring clips 154 come into contact with sides 228 (FIG. 7) of slots 180, causing the spring clips 154 to be cammed upwards until the locking members 156 press downwardly on upper surface 181 of top part 170. Once the cut portions 184 of the slots 180 are released from the shelves 152, the downward bias imparted by the spring clips 154 to the assembly housing 34 aids in releasing the assembly housing 34 from the base 32. At this point the tool head 22, with the assembly housing 34 contained therein, can be withdrawn downwardly from the vicinity of the base 32. When the tool head is at floor level, the assembly housing 34 is removed therefrom and the removal procedure is complete.

Figure 9:
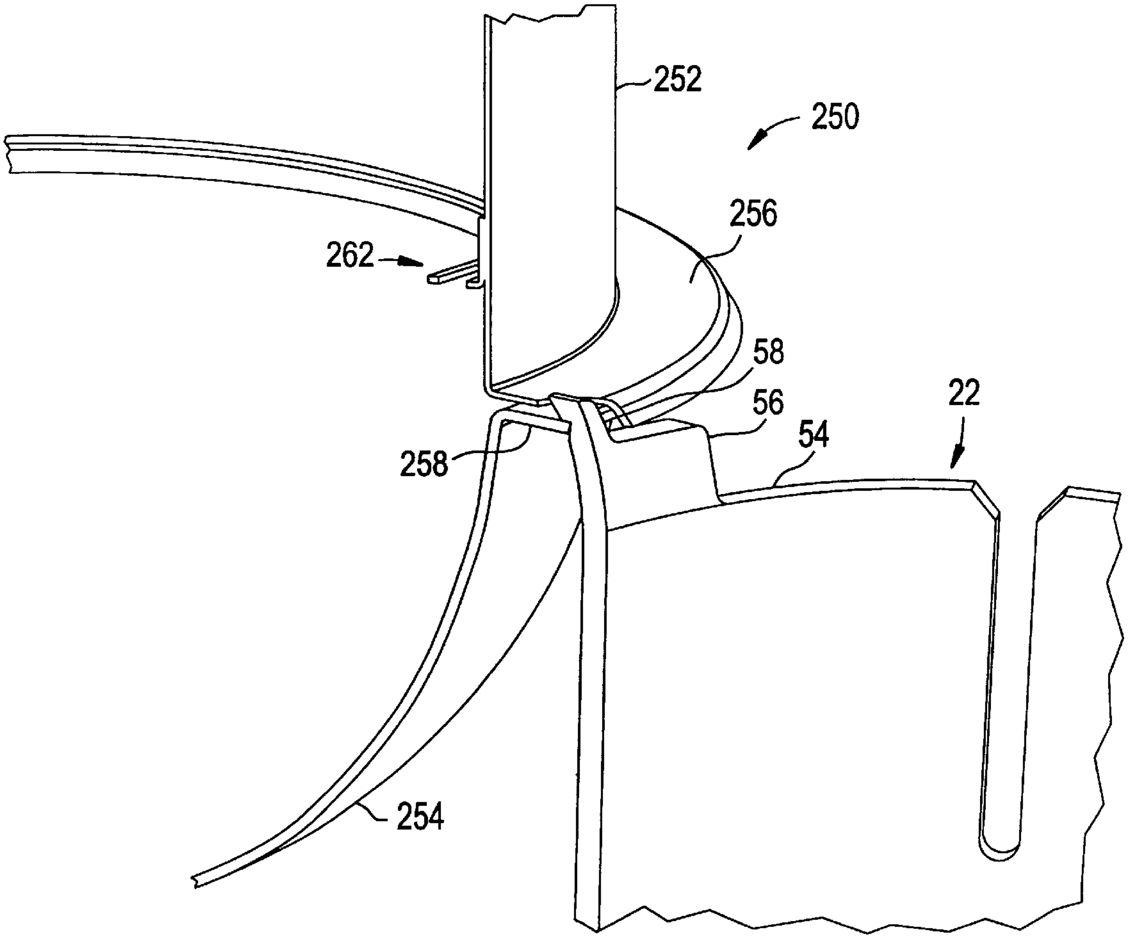
FIG. 9 is a cut-away perspective view showing a detail of an operation in which the tool of FIG. 1 is used to open a camera assembly shelter structure.

FIG. 8(*g*) generally illustrates how the tool 20 may be used to open a shelter structure 250 in which the camera dome of the present invention may optionally be installed. The shelter structure 250 is made up of a generally cylindrical upper part 252 to be mounted on the ceiling in a position concentric with and therefore surrounding the base of the camera dome, and also a bowl-shaped lower part 254 for closing the bottom of the upper part 252. A hinge (not shown) may be used to mount the lower part 254 on the upper part 252 of the shelter structure. A catch is provided opposite the hinge and one of the fingers 58 on the tool head 22 is used to open the catch, as shown in some detail in FIG. 9. As seen in FIG. 9, an annular skirt 256 extends outwardly at the lower edge of the upper part 252 of the shelter structure. An annular lip 258 extends outwardly from an upper edge of the lower part 254 and is held in proximity to the skirt 256. An indent 260 formed at the edge of the skirt 256 allows the finger 58 of the tool head 22 to be pushed downwardly on the lip 258 to release the catch shown at 262, thereby allowing the bowl-shaped part 254 to pivot downwardly. The tool head 22 can then be used to reach inside the upper part 252 of the shelter structure 250 for the purpose of removing the camera dome (not shown in FIGS. 9, 8(*g*)), according to the procedure which was previously described.

As seen from FIG. 8(*f*) the tabs 56 on the tool head 22 may also be used to push the bowl-shaped part 254 upwardly and into a closed position after the camera dome has been removed/reinstalled.

The dome removal/installation tool and the dome assembly disclosed herein together form a convenient and reliable system for installing and removing surveillance cameras from ceilings or other installation locations that are far above floor or ground level. Dome removal and reinstallation may be performed without using a ladder or scaffolding so that relatively untrained personnel can perform removal and reinstallation easily and safely. The tool head disclosed herein has no moving parts and can be easily and inexpensively manufactured of molded plastic or like material. It is particularly advantageous that the tool head is shaped to almost entirely enclose the dome assembly during handling, thereby minimizing any risk of damage to the dome assembly.

Although the tool as disclosed herein engages the dome assembly by means of a system of ridges on the dome assembly engaged by slots provided on the tool head, it is contemplated to reverse this mechanism, by providing inwardly projecting vertical ridges on the interior of the tool head, for engagement with vertically extended slots that may be formed in a built-up belt girdling a central portion of the dome housing.

Since the assembly housing shown herein is generally cylindrical, it will be understood that the housing is essentially circular in terms of its horizontal cross-section. As an alternative, it is contemplated that the housing be formed so as to have a square or other polygonal horizontal cross-section, and that the hollow head portion of the removal/installation tool have a corresponding polygonal horizontal cross-section, so that outside corners of the housing are engaged by inside corners of the tool head when the housing is contained within the tool head. Preferably the cylindrical top part 170 of the housing is mounted above the polygonal-cross-sectioned main part of the housing so that the housing can be readily fitted to and rotated relative to a base 32 like that shown herein.

Various other changes to the foregoing dome removal and installation tool and to the dome assembly, and modifications in the described practices, may be introduced without departing from the invention. The particularly preferred methods and apparatus are thus intended in an illustrative and not limiting sense. The true spirit and scope of the invention are set forth in the following claims.

What is claimed is:

1. A tool for removing a surveillance camera assembly housing from a base on which the assembly is mounted, comprising:

a pole portion; and a camera assembly housing engagement portion, mounted on said pole portion, said engagement portion including means for engaging the camera assembly housing at a plurality of points on a peripheral surface of the assembly housing, said engagement portion being formed as a single unitary body.

2. A tool according to claim 1, wherein said engagement portion is generally in the shape of a hollow cylinder in which the camera assembly housing is contained when the housing is engaged by said means for engaging.

3. A tool according to claim 2, wherein said means for engaging includes a plurality of slots formed in said cylinder, each of said slots for engaging a respective rib which projects outwardly from said peripheral surface of the camera assembly housing.

4. A tool according to claim 3, wherein said engagement portion has an alignment mark provided in alignment with one of said slots.

5. A tool according to claim 2, wherein said engagement portion has an open end which flares outwardly from a main wall of said engagement portion.

6. A tool according to claim 5, wherein said engagement portion has at least one finger provided at said flared open end for disengaging a catch on a camera assembly shelter structure.

7. A tool for removing a surveillance camera assembly housing from a base on which the assembly is mounted, comprising:

a pole portion; and a camera assembly housing engagement portion mounted on said pole portion, said engagement portion generally having a cylindrical shape and being sized to hold said assembly housing inside said engagement portion.

8. A tool according to claim 7, wherein said engagement portion includes means for engaging the camera assembly housing at a plurality of points on a peripheral surface of the assembly housing.

9. A tool according to claim 8, wherein said means for engaging includes a plurality of slots formed in said engagement portion.

10. A tool for removing a surveillance camera assembly housing from a base on which the assembly housing is mounted, consisting of:

a single unitary body for engaging said camera assembly housing;

a pole portion; and means for mounting said single body on said pole portion in a manner which prevents rotation and pivoting of said single body relative to said pole portion.

11. A tool according to claim 10, wherein said single unitary body is generally in the shape of a hollow cylinder in which the camera assembly housing is contained when the housing is engaged by said single body.

12. A tool according to claim 11, wherein said single body includes a plurality of slots formed in said cylinder, each of said slots for engaging a respective rib which projects from a peripheral surface of the camera assembly housing.

13. A tool for removing a surveillance camera assembly housing from a base on which the assembly housing is mounted, comprising:

a pole portion; and an engagement portion, mounted on said pole portion and having formed in the engagement portion at least one slot for engaging a respective rib provided on said housing.

14. A tool according to claim 13, wherein said engagement portion is a generally cylindrical body in which said at least one slot is formed.

15. A method of installing a surveillance camera assembly housing on a mounting base, comprising the steps of:

providing an installation tool which includes a hollow member;

engaging said housing with said installation tool by placing said housing inside said hollow member;

lockingly mounting said housing on said mounting base by manipulating said installation tool with said housing inside said hollow member; and disengaging said installation tool from said housing.

16. A method according to claim 15, wherein said installation tool includes a pole portion having a first end at which the hollow member is mounted and a second end; and said mounting step includes manipulating the second end of said pole portion.

17. A method according to claim 15, wherein said hollow member is generally cylindrical in shape.

18. A method of removing a surveillance camera assembly housing from a base on which the assembly housing is lockingly mounted, the method comprising the steps of:

providing an installation tool which includes a hollow member;

engaging said housing with said installation tool by moving said hollow member relative to said housing so that said housing is inserted into said hollow member; and releasing a locking mechanism which secures said housing to said base by manipulating said installation tool with said housing inside said hollow member.

19. A method according to claim 18, wherein said installation tool includes a pole portion having a first end at which the hollow member is mounted and a second end; and said releasing step includes manipulating the second end of said pole portion.

20. A method according to claim 18, wherein said hollow member is generally cylindrical in shape.

21. A surveillance camera mounting system, comprising:

a base for being mounted on a support structure;

a surveillance camera assembly housing for being removably mounted on said base; and a tool for removing said housing from said base, said tool including a hollow member sized to have said assembly housing placed within the hollow member.

22. A surveillance camera mounting system according to claim 21, wherein said hollow member is generally cylindrical and has provided thereon means for engaging said camera assembly housing.

23. A surveillance camera mounting system, comprising:

a base for being mounted on a support structure; and a surveillance camera assembly housing for being removably mounted on said base; wherein:

said base includes a shelf member on which said assembly housing is supported; and said assembly housing has an aperture in a top surface of the housing, said shelf member being inserted in said aperture, and said housing also having a cam surface adjacent to said aperture, said cam surface inclined relative to a horizontal plane for contacting said shelf member and camming said housing in an upward direction when said housing is rotated relative to said base.

24. A surveillance camera mounting system, comprising:

a base for being mounted on a support structure; and a surveillance camera assembly housing for being removably mounted on said base, said assembly housing having a substantially cylindrical peripheral surface and a plurality of vertically-oriented ribs arranged at intervals around said peripheral surface.

25. A surveillance camera mounting system according to claim 24, wherein said plurality of ribs consists of three ribs arranged at substantially equal intervals around said peripheral surface.

* * * * *